(12) United States Patent
Chia

(10) Patent No.: US 8,184,378 B2
(45) Date of Patent: May 22, 2012

(54) COMPACT ZOOM LENS SYSTEM AND IMAGE PICKUP DEVICE WITH THE SAME

(75) Inventor: Shuo-chi Chia, Tantz Shiang (TW)

(73) Assignee: Asia Optical Co., Inc., Tantz Shiang, Taichung (TW)

( * ) Notice: Subject to any disclaimer, the term of this patent is extended or adjusted under 35 U.S.C. 154(b) by 235 days.

(21) Appl. No.: 12/712,183

(22) Filed: Feb. 24, 2010

(65) Prior Publication Data

US 2010/0214664 A1 Aug. 26, 2010

(30) Foreign Application Priority Data

Feb. 24, 2009 (TW) .............................. 98105879 A

(51) Int. Cl.
*G02B 17/00* (2006.01)

(52) U.S. Cl. .................. 359/689; 359/678; 359/726
(58) Field of Classification Search .................. 359/676, 359/678, 683, 684, 686, 689, 726–728; 396/72–88; 348/240.99–240.3, 335–369

See application file for complete search history.

(56) References Cited

U.S. PATENT DOCUMENTS

| 5,909,318 | A | 6/1999 | Tanaka |
| 6,853,807 | B2 * | 2/2005 | Hagimori et al. ............... 396/72 |
| 7,068,441 | B2 | 6/2006 | Kim |
| 7,242,529 | B2 | 7/2007 | Sato et al. |
| 7,256,945 | B2 | 8/2007 | Sueyoshi |
| 2005/0141100 | A1* | 6/2005 | Kojima et al. ............... 359/680 |

* cited by examiner

*Primary Examiner* — Darryl J Collins
(74) *Attorney, Agent, or Firm* — Cheng-Ju Chiang

(57) ABSTRACT

A compact zoom lens system includes, in order from an object side to an image side along an optical axis thereof, a first lens group having positive refractive power, a second lens group having positive refractive power and a third lens group also having positive refractive power. The first lens group is stationary and includes a reflecting element for bending the optical path. The second and third lens groups are movable along the optical axis, and each of the first, second and third lens groups has at least one aspheric lens surface. When zooming from a wide-angle end to a telephoto end, the second lens group moves toward the object side and the third lens group moves toward the image side, so as to reduce the spacing between the first and second lens groups and increase the spacing between the second and third lens groups. By this specific optical configuration, the compact zoom lens system has the advantages of small size, simple structure, low cost, good reliability and better image quality.

18 Claims, 11 Drawing Sheets

COMPACT ZOOM LENS SYSTEM AND IMAGE PICKUP DEVICE WITH THE SAME

BACKGROUND OF THE INVENTION

1. Field of the Invention

The present invention relates to a zoom lens system and an image pickup device adopting the zoom lens system as an image pickup lens, and particularly to a compact zoom lens system and a small-sized image pickup device adopting the compact zoom lens system, such as digital still cameras and home video cameras.

2. Description of Prior Art

Recently, digital still cameras and digital video cameras have been widely used in household. With the increasingly compact design of an image sensor used in these image pickup devices, such as a CCD (Charge Coupled Device) sensor or a CMOS (Complementary Metal Oxide Semiconductor) sensor, the image pickup device adopting the image sensor also has been required to be further compact to meet the trend of small size, light weight and portability. Correspondingly, imaging lenses mounted in these image pickup devices, especially for zoom lens systems, also have been designed to be compact by shortening the overall length thereof. Further, for these imaging lenses, especially for those used in digital still cameras, besides the compact requirement, the lens performance is also required to be increased to accord with an image pickup device with high image resolution.

Conventionally, for a zoom lens system having a magnification or zoom ratio of about 3×, the configuration of three lens groups is widely adopted for the sake of shortening the overall length of the zoom lens system. This kind of zoom lens system is disclosed, for example, in U.S. Pat. No. 5,909,318. The '318 patent discloses a three-group telescopic zoom lens system which in use can be outstretched beyond the body of a camera accommodating it and each lens group of which is movable. When not in use, each lens group of this telescopic zoom lens system is retracted back into the camera body, so as to shorten the overall length. However, such a telescopic zoom lens system is quite limited in dust, water and drop protection since in use the lens barrel supporting the movable lens groups needs to be extended out of the camera body.

Accordingly, an inner focusing zoom lens system with fixed overall length has been proposed in the art to meet both compactness and durability requirements. Such an inner focusing zoom lens system is disclosed, for example, in U.S. Pat. Nos. 7,068,441; 7,242,529 and 7,256,945. The zoom lens systems disclosed by these patents each have a first lens group fixedly positioned for increasing the durability of the lens. In addition, a right-angle prism is arranged in the first lens group to reflect the incident light from the object by 90 degrees, so as to shorten the overall length of the optical system. However, each of the zoom lens systems disclosed by these patents is configured with five lens groups, most of which are movable to effect zooming and focusing. These movable lens groups are moved over a relatively long distance, thereby increasing the overall length of the zoom lens system. In addition, besides the right-angle prism, each zoom lens system is comprised of 9 to 11 lens elements. This further extends the overall length of the zoom lens system and thus increases the size, cost and weight of an image pickup device adopting this zoom lens system.

Hence, the above-mentioned conventional inner focusing zoom lens systems with a light path bending element still need to be improved to follow the compactness and low-cost trend of image pickup devices while providing comparable imaging performance.

SUMMARY OF THE INVENTION

A primary object of the present invention is to provide a compact zoom lens system suitable for use with a small-sized image pickup device, which has the advantages of small size, simple structure, low cost, good reliability and better image quality.

A second object of the present invention is to provide an image pickup device adopting the above compact zoom lens system.

To achieve the primary object, the present invention provides a compact zoom lens system includes, in order from an object side to an image side along an optical axis thereof, a first lens group having positive refractive power, a second lens group having positive refractive power and a third lens group having positive refractive power. The first lens group is stationary and includes a reflecting element for bending the optical path. The second and third lens groups are movable along the optical axis, and each of the first, second and third lens groups has at least one aspheric lens surface. When zooming from a wide-angle end to a telephoto end, the second lens group moves toward the object side and the third lens group moves toward the image side, so as to reduce the spacing between the first and second lens groups and increase the spacing between the second and third lens groups.

According to a preferred embodiment of the present invention, the reflecting element is in the form of a prism or a reflecting mirror. Preferably, the reflecting element is a right-angle prism.

According to the preferred embodiment of the present invention, the third lens group serves as a compensating lens group to move together with the second lens group during zooming, and then moves independently for focusing.

According to the preferred embodiment of the present invention, the first lens group includes, in order from the object side to the image side along the optical axis, a first lens having negative refractive power, the reflecting element and a second lens having positive refractive power, wherein the first lens is disposed beneath the reflecting element. Preferably, the second lens is an aspheric lens and both the object-side surface and the image-side surface thereof are made aspheric. The first lens is a meniscus concave lens convex toward the object side and the second lens is a meniscus convex lens convex toward the image side.

According to the preferred embodiment of the present invention, the second lens group includes, in order from the object side to the image side along the optical axis, a first lens having positive refractive power, a second lens having positive refractive power and a third lens having negative refractive power. The first lens of the second lens group is an aspheric lens and both the object-side surface and the image-side surface thereof are made aspheric. Preferably, the first, second and third lenses of the second lens group are respectively in the form of a biconvex lens, a biconvex lens and a biconcave lens. The second and third lenses of the second lens group are cemented with each other to constitute a cemented lens having negative refractive power.

According to the preferred embodiment of the present invention, the second lens group further includes an aperture stop disposed on the object side of the first lens of the second lens group and movable with the second lens group during zooming.

According to the preferred embodiment of the present invention, the third lens group consists of a biconvex lens. The biconvex lens has an aspheric surface and is made of plastic. A filter is further disposed between the third lens group and the image plane.

To achieve the second object, the present invention provides an image pickup device at least having an image sensor and a zoom lens system. The zoom lens system includes, in order from an object side to an image side along an optical axis thereof, a first lens group having positive refractive power, a second lens group having positive refractive power and a third lens group having positive refractive power. The first lens group is stationary and includes a reflecting element for bending the optical path. The second and third lens groups are movable along the optical axis, and each of the first, second and third lens groups has at least one aspheric lens surface. When zooming from a wide-angle end to a telephoto end, the second lens group moves toward the object side and the third lens group moves toward the image side, so as to reduce the spacing between the first and second lens groups and increase the spacing between the second and third lens groups.

In comparison with the prior art, the compact zoom lens system constructed according to the present invention only consist of three lens groups all having positive refractive power. Preferably, the present compact zoom lens system is only comprised of six lenses and one reflecting element. The first lens group is stationary to allow for a fixed overall length and better reliability of the present zoom lens system. The second and third lens groups are both movable along the optical axis to effect zooming and focusing. The first lens group has a reflecting element for bending the incident light path from the object to be photographed, thereby shortening the total length of the optical system. In addition, each of the first, second and third lens groups has at least one aspheric lens surface, whereby various aberrations can be effectively corrected to obtain optimal image quality. By this specific optical configuration, the compact zoom lens system of the present invention has the advantages of small size, simple structure, low cost, good reliability and better image quality.

BRIEF DESCRIPTION OF THE DRAWINGS

The present invention may be best understood through the following description with reference to the accompanying drawings, in which.

DETAILED DESCRIPTION OF THE PREFERRED EMBODIMENTS

The above-mentioned and other technical contents, features and effects of the present invention will become apparent from the hereinafter set forth detailed description of preferred numerical embodiments of the present invention in combination with the drawings.

Figure 1:
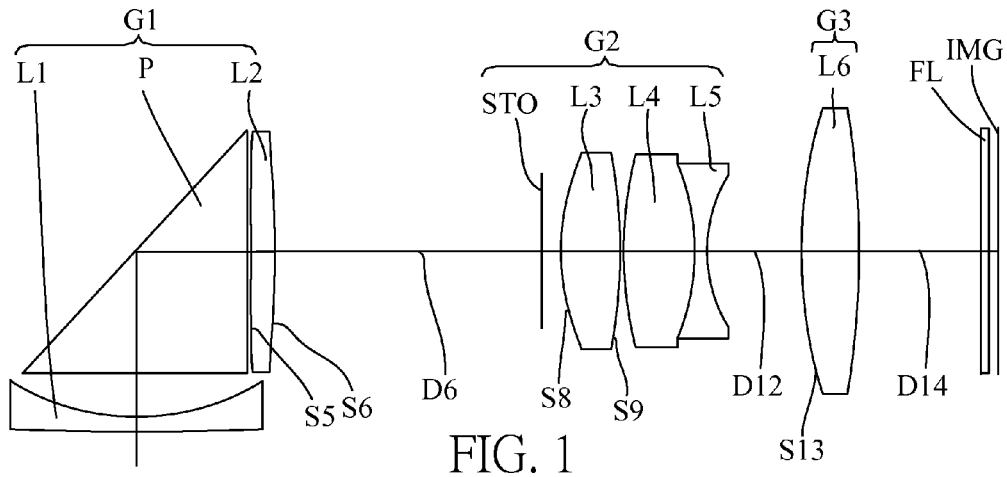
FIG. 1 is a schematic view illustrating the optical arrangement of the present compact zoom lens system at a wide-angle end.
Figure 2:
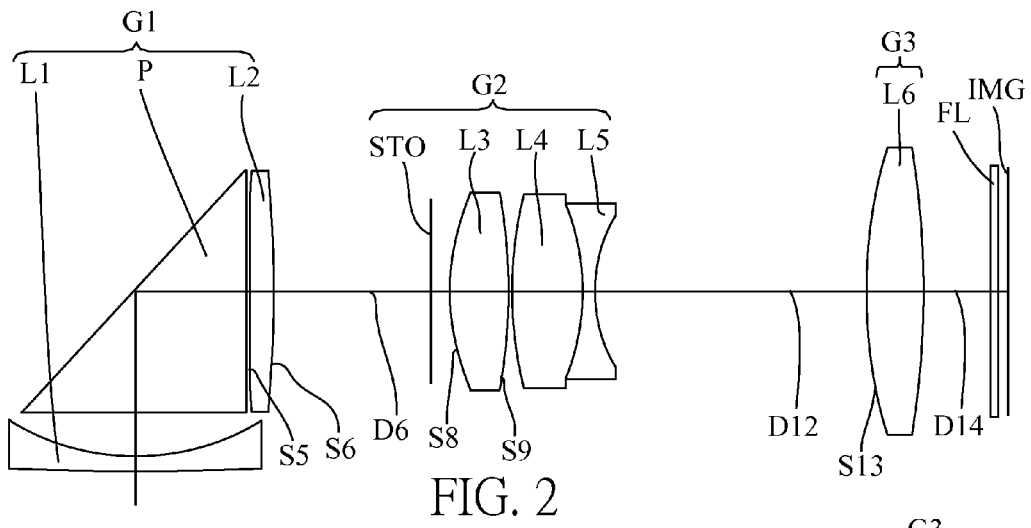
FIG. 2 is a schematic view illustrating the optical arrangement of the present compact zoom lens system at a medium-angle end.
Figure 3:
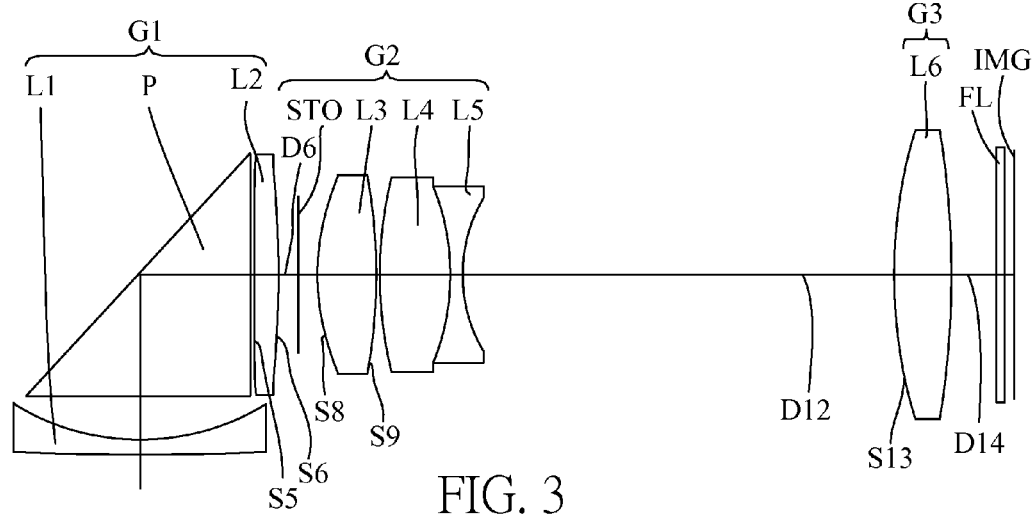
FIG. 3 is a schematic view illustrating the optical arrangement of the present compact zoom lens system at a telephoto end.
Figure 4:
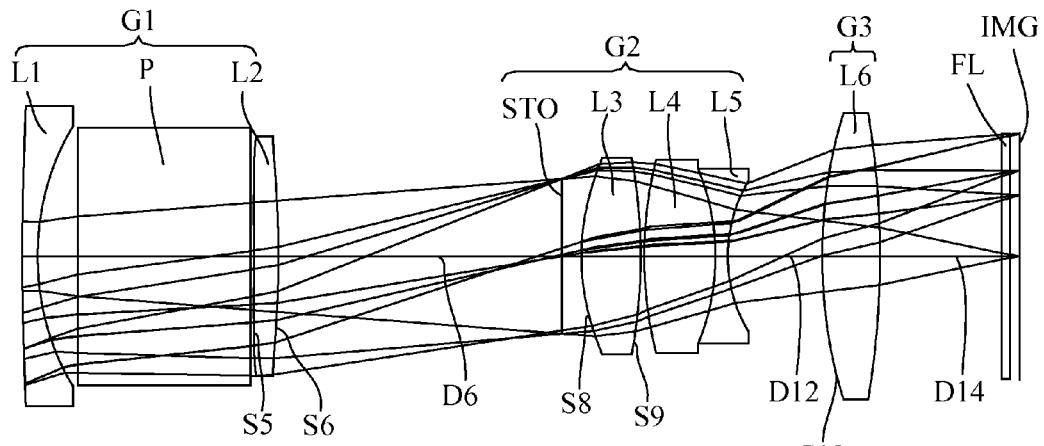
FIG. 4 is a schematic view showing the light path through the present compact zoom lens system at the wide-angle end.
Figure 5:
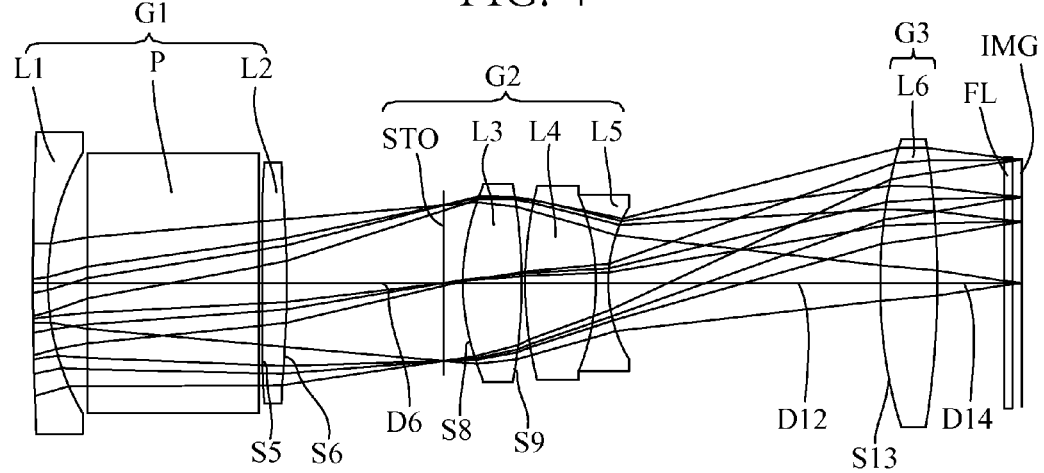
FIG. 5 is a schematic view showing the light path through the present compact zoom lens system at the medium-angle end.
Figure 6:
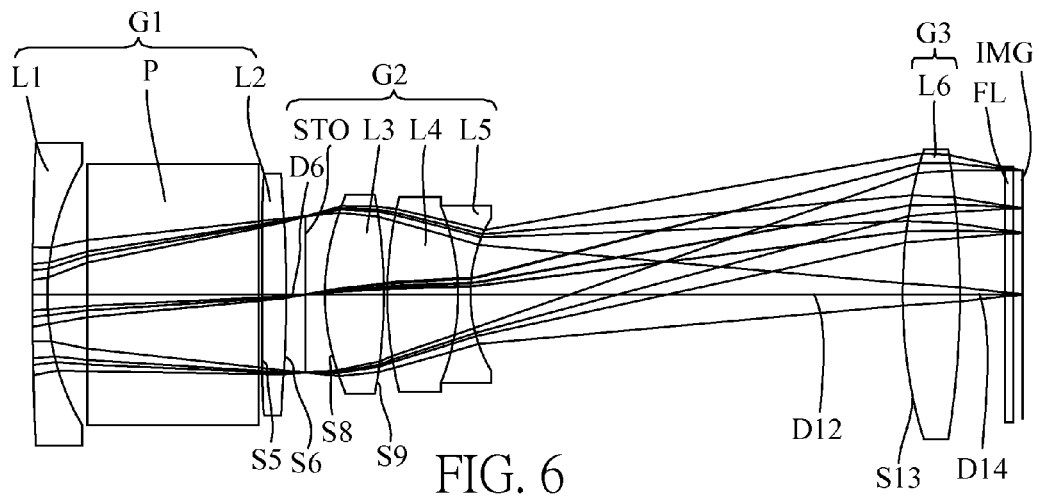
FIG. 6 is a schematic view showing the light path through the present compact zoom lens system at the telephoto end.

The compact zoom lens system according to the present invention is used in a small-sized image pickup device, such as a digital still camera or a home video camera, for forming an image of an object onto an image sensor (CCD or CMOS). FIGS. 1-3 are schematic views respectively illustrating the optical arrangement of the present compact zoom lens system at a wide-angle end, a medium-angle end and a telephoto end. FIGS. 4-6 are schematic views respectively showing the light paths through the present compact zoom lens system at the wide-angle end, the medium-angle end and the telephoto end.

With reference to FIGS. 1 to 3, the compact zoom lens system according to the present invention includes, in order from an object side to an image side along an optical axis thereof, a first lens group G1 having positive refractive power, a second lens group G2 having positive refractive power and a third lens group G3 having positive refractive power. The first lens group G1 is stationary and includes a reflecting element P for bending an incident light path from an object to be photographed. The second and third lens groups G2 and G3 are movable along the optical axis to effect zooming and focusing.

The first lens group G1 having positive refractive power is fixed in position and consists of a first lens L1, the reflecting element P and a second lens L2. The first lens L1 serves to transmit the incident light from the object to the reflecting element P. The reflecting element P is disposed above the first lens L1 for changing the path of the incident light passing the first lens L1 and then transmitting the light into the second lens L2. Preferably, the first lens L1 is a meniscus concave lens having negative refractive power, and is configured to be a convex structure convex toward the object side and has at least one aspheric surface. The reflecting element P, which may take the form of a prism or a reflecting mirror, serves to effectively shorten the total length of the optical system of the present zoom lens system. In a preferred embodiment of the present invention, the reflecting element P is in the form of a right-angle prism. The second lens L2 is a meniscus convex lens having positive refractive power, and is configured to be a convex structure convex toward the image side. By making at least one lens of the first lens group to be aspheric, aberrations can be effectively corrected, the system length can be shortened, the effective diameter of the first lens L1 can be reduced and the size of the reflecting element P also can be reduced.

The positive second lens group G2 is movable along the optical axis to change the zoom ratio of the optical system and moves the longest distance. The second lens group G2 consists of three lenses, which are a third lens L3, a fourth lens L4 and a fifth lens L5 arranged in order form the object side to the image side along the optical axis. The fourth lens L4 and the fifth lens L5 are cemented with each other to constitute a cemented lens. Preferably, the third lens L3 is a positive biconvex lens having at least one aspheric surface to shorten the system length and correct aberrations, the fourth lens L4 is a positive biconvex lens and the fifth lens L5 is a negative biconcave lens. The cemented lens constituted by the fourth lens L4 and the fifth lens L5 has negative refractive power. The second lens group G2 further includes an aperture stop STO for adjusting light flux. The aperture stop STO is arranged between the second lens L2 of the first lens group G1 and the third lens L3 of the second lens group G2 and is moved together with the second lens group G2 during zooming.

The third lens group G3 also has positive refractive power and is movable along the optical axis for focusing. The third lens group G3 is comprised of a sixth lens L6 that is in the form of a biconvex lens and has one aspheric surface. Preferably, the sixth lens L6 is made of plastic to further reduce the production cost of the present zoom lens system without affecting the lens performance.

An optical element is further provided between the third lens group G3 and the image plane IMG. The optical element may be a filter FL in the form of an infrared cut filter ICF, a cover glass coated with optical films or any optical element that is known in the art to achieve certain functions. The image plane IMG is a light-receiving surface of an image sensor such as CCD.

In the compact zoom lens system of the present invention, zooming is achieved by moving the second and third lens groups G2 and G3 along the optical axis. Further, the present compact zoom lens system adopts a rear focusing system, that is, only the third lens group G3 moves during focusing.

As shown in FIGS. 1 to 3, when zooming from the wide-angle end (FIG. 1) to the telephoto end (FIG. 3), the first lens group G1 of the present zoom lens system remains stationary, the second lens group G2 moves toward the object side and the third lens group G3 moves toward the image side, so that the first variable spacing D6 between the first and second lens groups G1, G2 is reduced, the second variable spacing D12 between the second and third lens groups G2, G3 is increased, and the third variable spacing D14 between the third lens group G3 and the filter FL is reduced. During the zooming operation, the aperture stop STO moves together with the second lens group G2.

The focusing operation of the present compact zoom lens system is accomplished by the third lens group G3. When focusing at close distance, the third lens group G3 moves linearly along the optical axis toward the object side to approach the second lens group G2, whereby the third variable spacing D14 between the third lens group G3 and the filter FL is increased. When focusing at infinite distance, the third lens group G3 moves linearly along the optical axis toward the image side to depart from the second lens group G2, whereby the third variable spacing D14 between the third lens group G3 and the filter FL is decreased. As mentioned above, the third lens group G3 also serves as a compensating lens to move together with the second lens group G2 during the zooming operation to compensate for a shift in the image plane due to a variation in magnification during zooming. The third lens group G3 then moves independently for effecting the focusing operation.

Numerical values of the constituent optical elements of the present zoom lens system according to a numerical embodiment are shown in Data Table 1 given below. In Data Table 1, "Si" represents the order of the surface from the object side to the image side along the optical axis (including incident and exit surfaces of the lenses L1-L6, the reflecting element P, the aperture stop STO and the filter FL), "INF" represents a planar surface, "Ri" represents the radius of curvature (mm) of the ith surface from the object side, "Di" represents the ith member thickness or the distance (mm) between the ith surface and the (i+1)th surface along the optical axis. In addition, the two surfaces cemented with each other are treated as one surface.

As mentioned above, in the present compact zoom lens system, each lens group G1, G2, G3 employs at least one aspheric lens surface in order to effectively correct various aberrations and thus obtain better imaging performance. Specifically, it is especially helpful to make at least one lens surface of the first lens group G1 to be aspheric.

DATA TABLE 1

| Si | Surface Shape | Element | Ri (mm) | Di (mm) | Material | Effective Radius (mm) |
|---|---|---|---|---|---|---|
| S1 | Spherical | L1 | 75.86 | 0.5500 | S-LAH66 | 4.40 |
| S2 | Spherical | | 6.33 | 1.4400 | | 3.80 |
| S3 | Planar | P | INF | 6.2400 | S-LAH55 | 3.78 |
| S4 | Planar | | INF | 0.1300 | | 3.52 |
| S5 | Aspheric | L2 | −406.93 | 0.8800 | SF57 | 3.51 |
| S6 | Aspheric | | −25.31 | D6 | | 3.47 |
| S7 | Dummy | STO | | 0.7000 | | 2.27 |
| S8 | Aspheric | L3 | 5.34 | 2.1400 | S-FSL5 | 2.85 |
| S9 | Aspheric | | −12.63 | 0.1300 | | 2.89 |
| S10 | Spherical | L4 | 9.49 | 2.5700 | S-LAH58 | 2.83 |
| S11 | Spherical | L5 | −5.57 | 0.4500 | S-LAH71 | 2.57 |
| S12 | Spherical | | 3.63 | D12 | | 2.22 |
| S13 | Aspheric | L6 | 12.24 | 2.0500 | 480R | 4.20 |
| S14 | Spherical | | −21.09 | D14 | | 4.20 |
| S15 | Planar | ICF | INF | 0.3000 | S-BSL7 | 3.71 |
| S16 | Planar | | INF | 0.3500 | | 3.67 |
| | | CCD | | | | |

It is shown in Data Table 1 that the present compact zoom lens system according to the numerical embodiment includes five aspheric surfaces. Specifically, with reference to FIGS. 1 to 3, both the object-side surface S5 and the image-side surface S6 of the meniscus concave lens L2 of the first lens group G1, both the object-side surface S8 and the image-side surface S9 of the biconvex lens L3 of the second lens group G2 and the object-side surface S13 of the biconvex lens L6 of the third lens group G3 are all configured to be aspheric surfaces. These aspheric surfaces are expressed by the following formula:

$$D = \frac{C \cdot H^2}{1 + \sqrt{1 - (1+K) \cdot C^2 \cdot H^2}} + E_4 \cdot H^4 + E_6 \cdot H^6 + E_8 \cdot H^8$$

where D represents displacement in the direction of the optical axis at the position of height H from the optical axis relative to the surface vertex; $C=1/r$; r is the curvature radius of the aspheric surface on the optical axis; H represents a height of a point on the aspheric surface with respect to the optical axis; K represents a cone constant; and $E_4$, $E_6$ and $E_8$ are respectively aspheric coefficients for fourth, sixth and eighth order terms.

Data Table 2 given below shows aspheric coefficients for the aspheric surfaces of the present compact zoom lens system according to the numerical embodiment, wherein K represents a cone constant and E4, E6 and E8 are respectively aspheric coefficients for fourth, sixth and eighth order terms.

DATA TABLE 2

| Si | K | $E_4$ | $E_6$ | $E_8$ |
|---|---|---|---|---|
| S5 | 4.03E−04 | −5.26E−05 | 7.68E−06 | −1.88E−07 |
| S6 | 0.000164605 | −4.79E−05 | 7.17E−06 | −1.69E−07 |
| S8 | −0.001067543 | −3.65E−06 | −3.05E−06 | 0.00E+00 |
| S9 | 0.000271747 | 3.22E−06 | −2.68E−06 | 0.00E+00 |
| S13 | −9.10E−05 | 1.67E−05 | −3.62E−07 | 0.00E+00 |

During zooming, as mentioned above, the first variable spacing D6 between the first lens group G1 and the second lens group G2 or the aperture stop STO, the second variable spacing D12 between the second lens group G2 and the third lens group G3 and the third variable spacing D14 between the third lens group G3 and the filter FL are all changed. Data Table 3 provided below shows the respective values of these variable spacings D6, D12 and D14 at the wide-angle end (W), the medium-angle end (M) and the telephoto end (T) according to the numerical embodiment.

DATA TABLE 3

| Variable Spacing/Parameter | W | M | T |
|---|---|---|---|
| EFL | 5.9478 | 9.448 | 15.138 |
| TTL | 35.83 | 35.68 | 35.63 |
| D6 | 10.2400 | 5.7124 | 0.7000 |
| D12 | 3.3800 | 9.9300 | 15.7171 |
| D14 | 4.4200 | 2.3900 | 1.6352 |

From Data Table 3, it can be known that the present compact zoom lens system has a relatively short total length TTL and has a zoom ratio of 2.55 times. When zooming from the wide-angle end to the telephoto end, both the first variable spacing D6 and the third variable spacing D14 are decreased, and the second variable spacing D12 is increased. In addition, the effective focal lengths fG1, fG2 and fG3 of the lens groups G1, G2 and G3 are respectively −16.366 mm, 11.776 mm and 15.0639 mm.

Figure 7A:
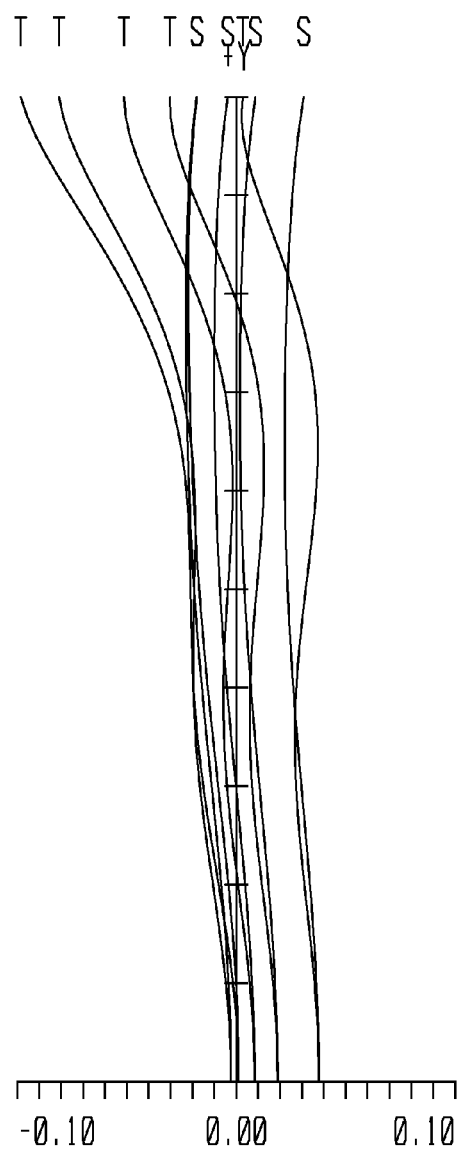
FIGS. 7A-7D are respective graphic representations of field curvature, distortion aberration, longitudinal spherical aberration and coma aberration according to a numerical embodiment of the present zoom lens system at the wide-angle end.
Figure 7B:
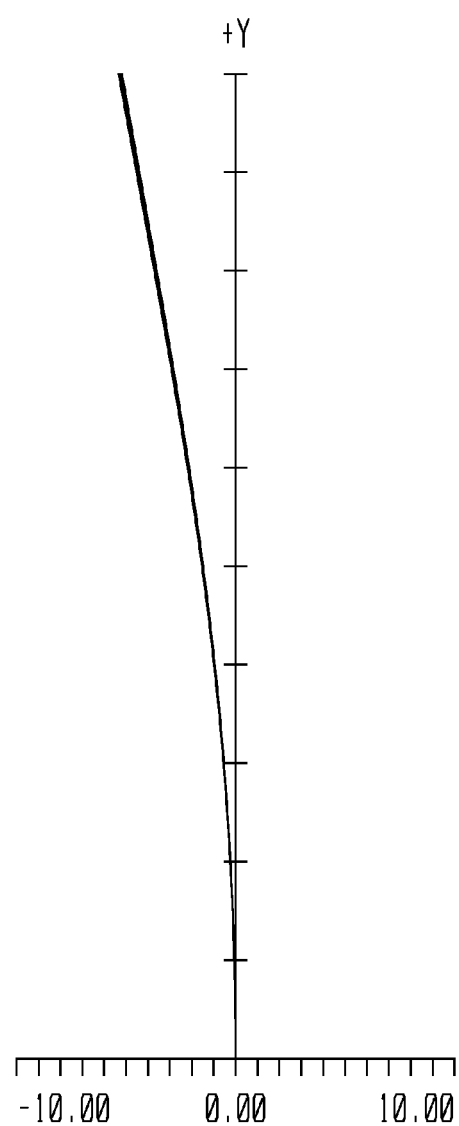
Figure 7C:
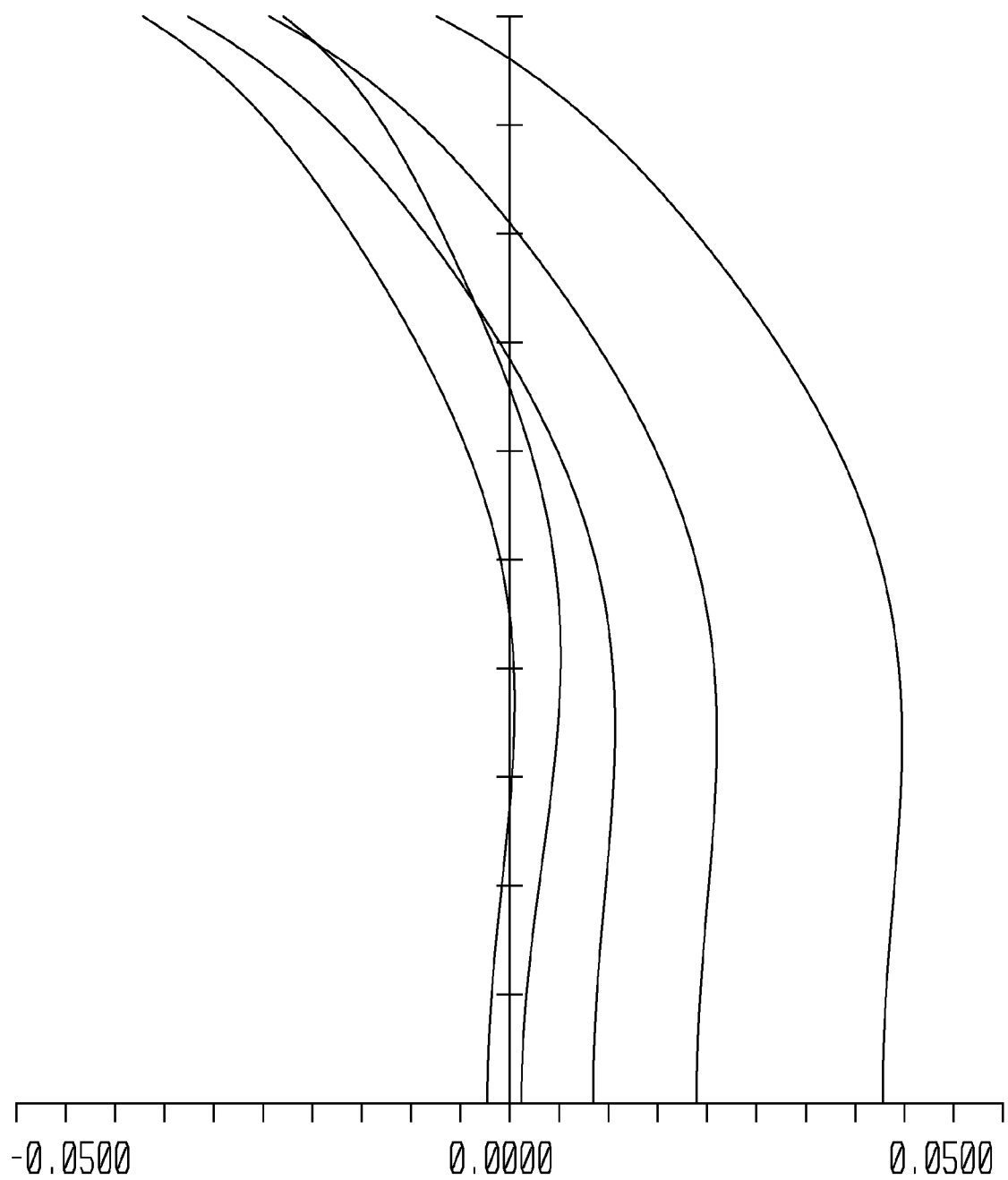
Figure 7D:
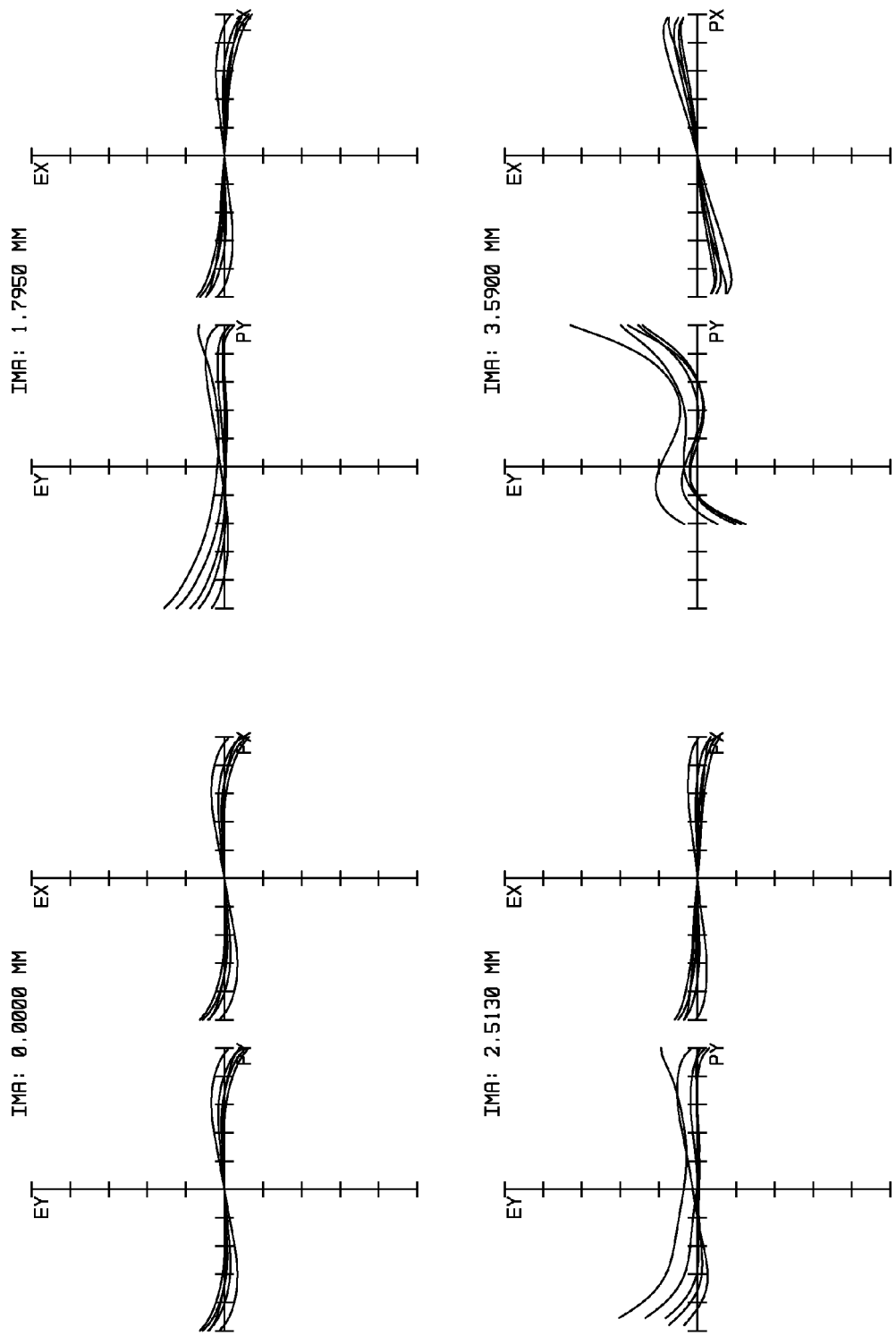
Figures 8A, 8B:
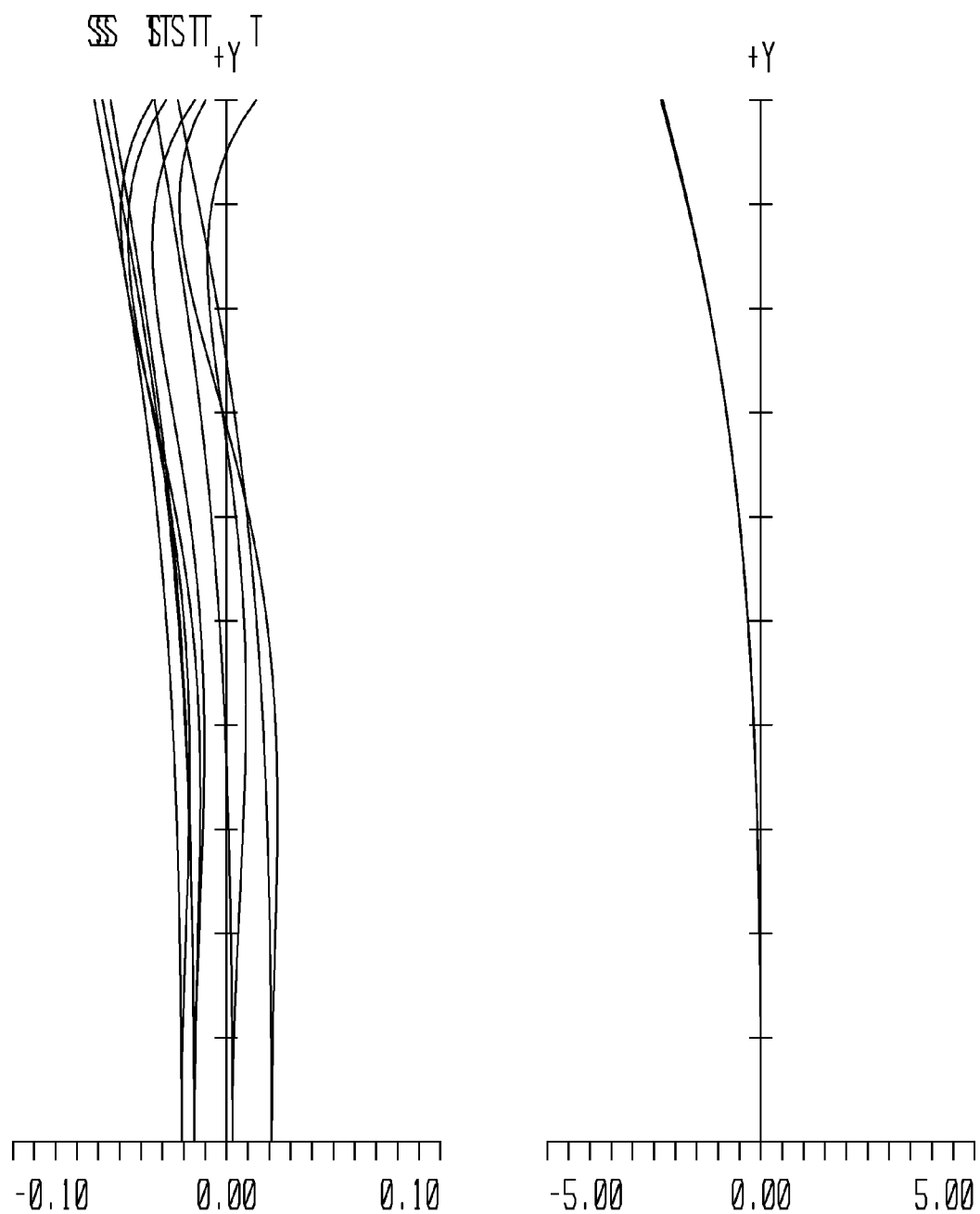
FIGS. 8A-8D are respective graphic representations of field curvature, distortion aberration, longitudinal spherical aberration and coma aberration according to a numerical embodiment of the present zoom lens system at the medium-angle end.
Figure 8C:
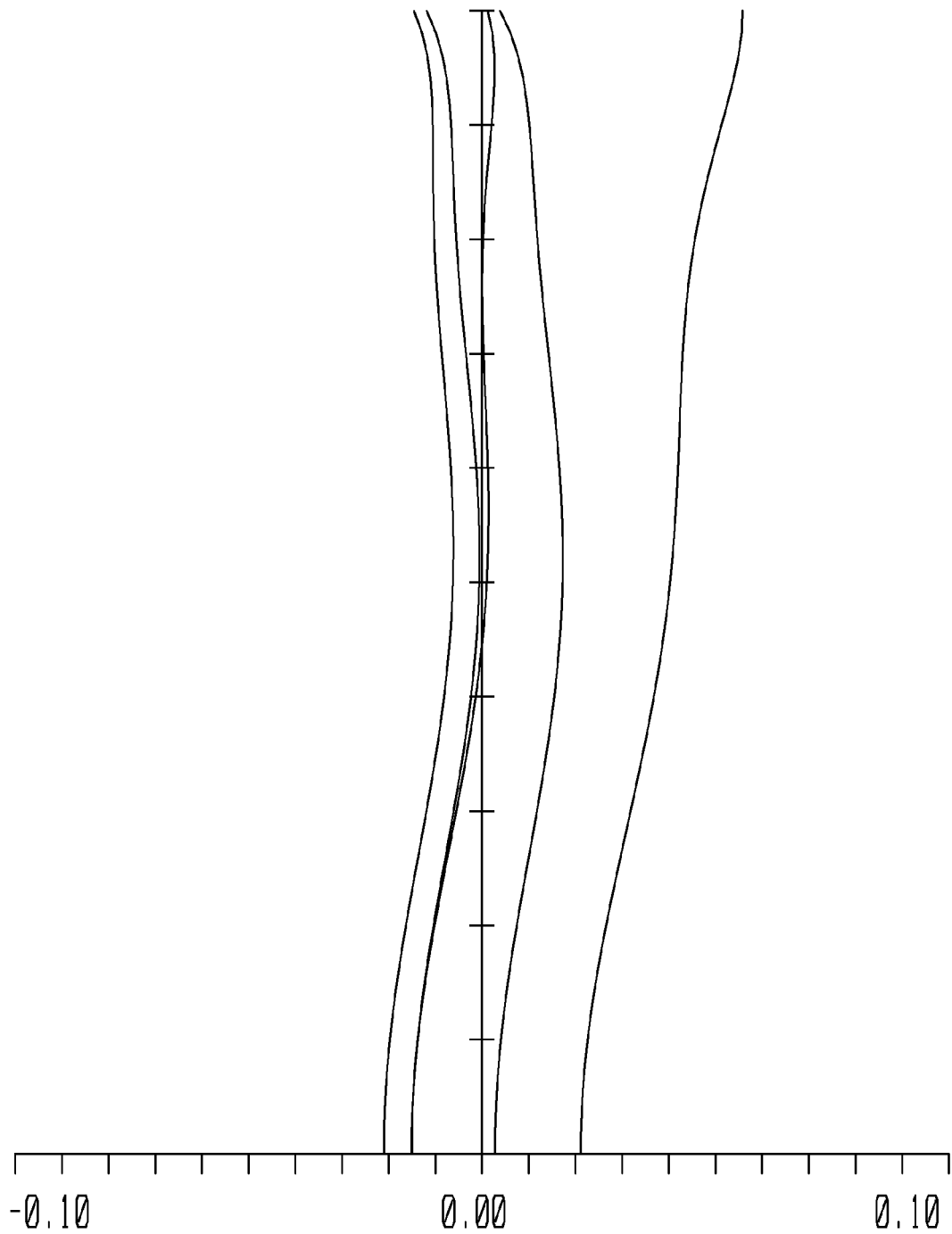
Figure 8D:
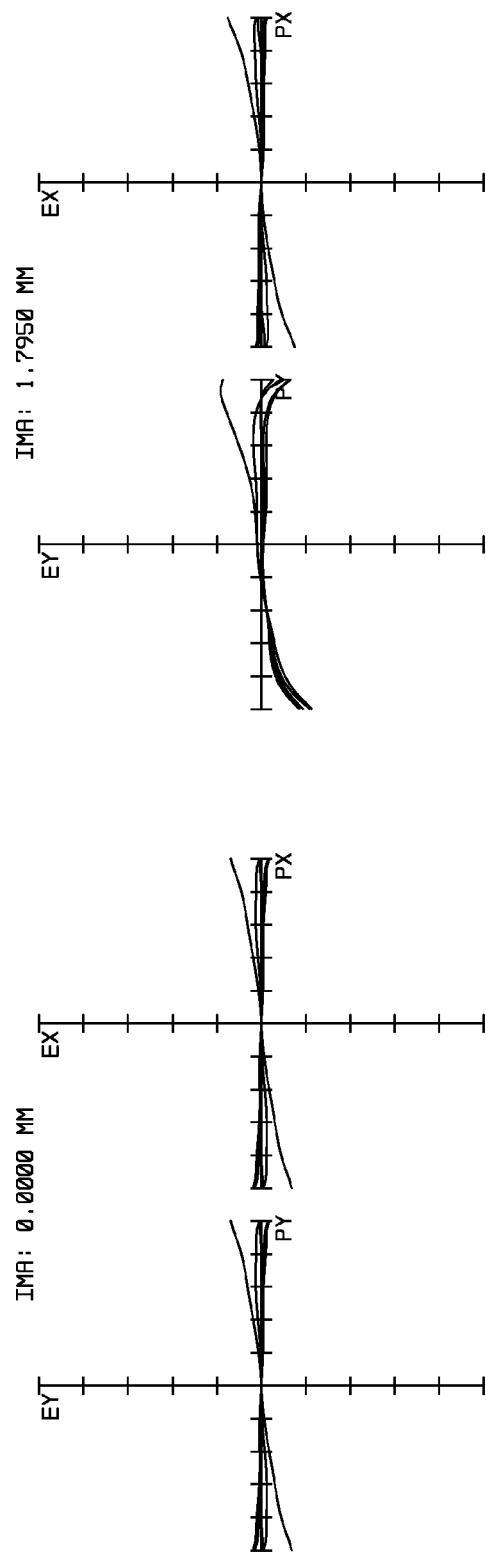
Figure 8D:
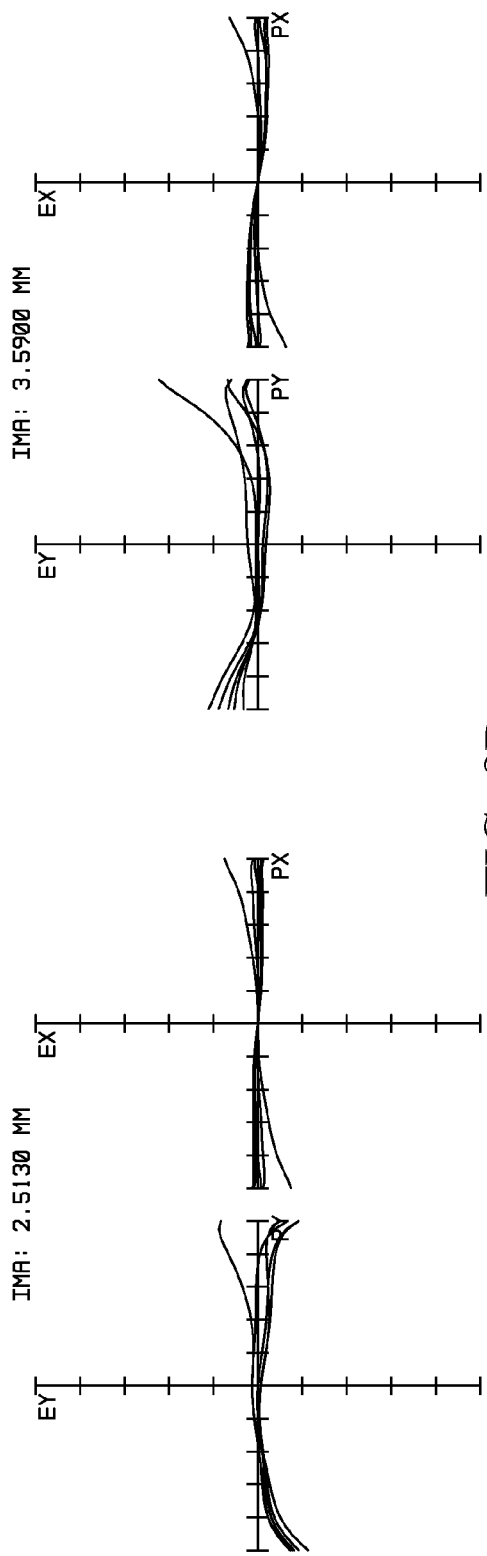
Figures 9A, 9B:
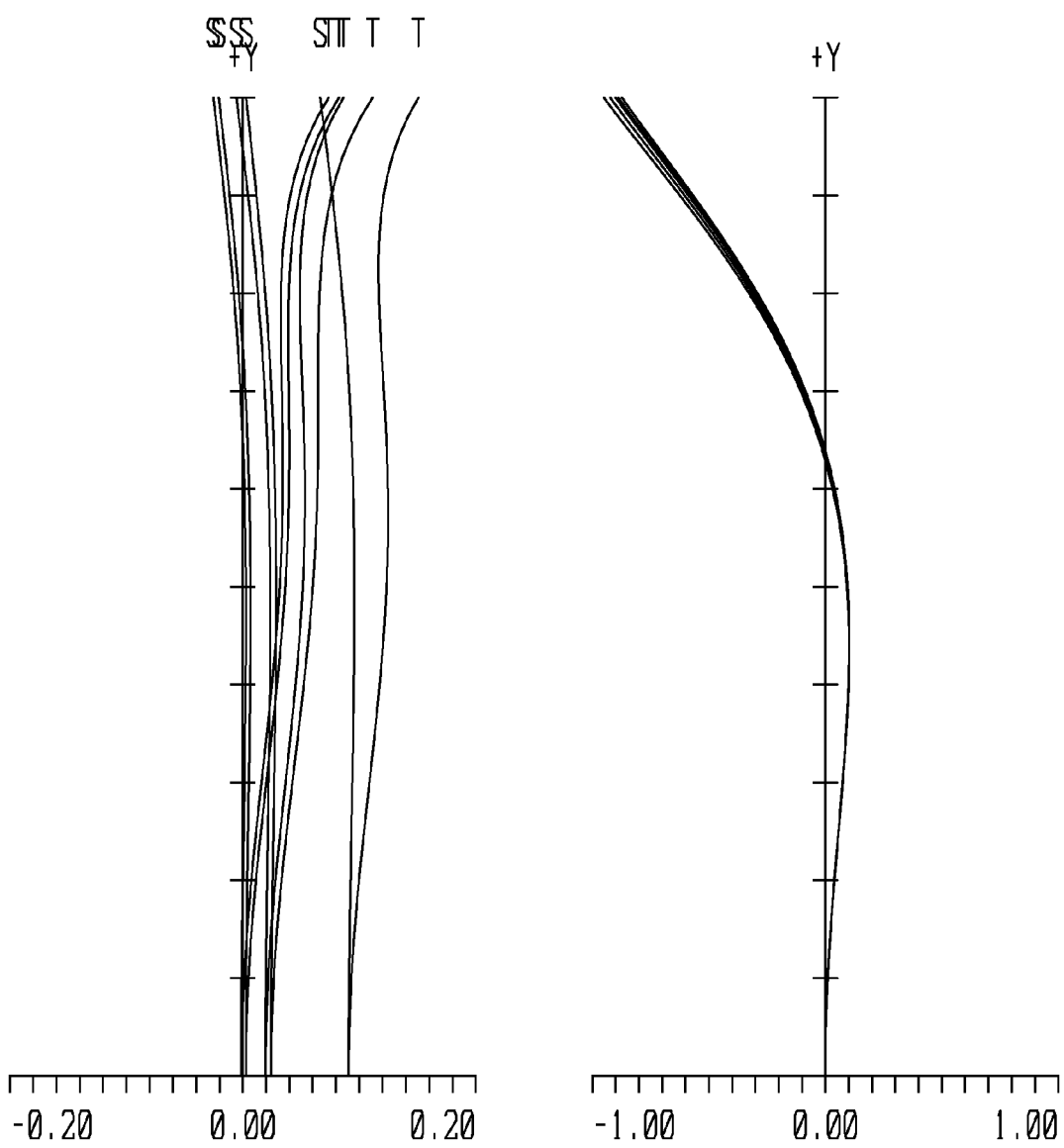
FIGS. 9A-9D are respective graphic representations of field curvature, distortion aberration, longitudinal spherical aberration and coma aberration according to a numerical embodiment of the present zoom lens system at the telephoto end.
Figure 9C:
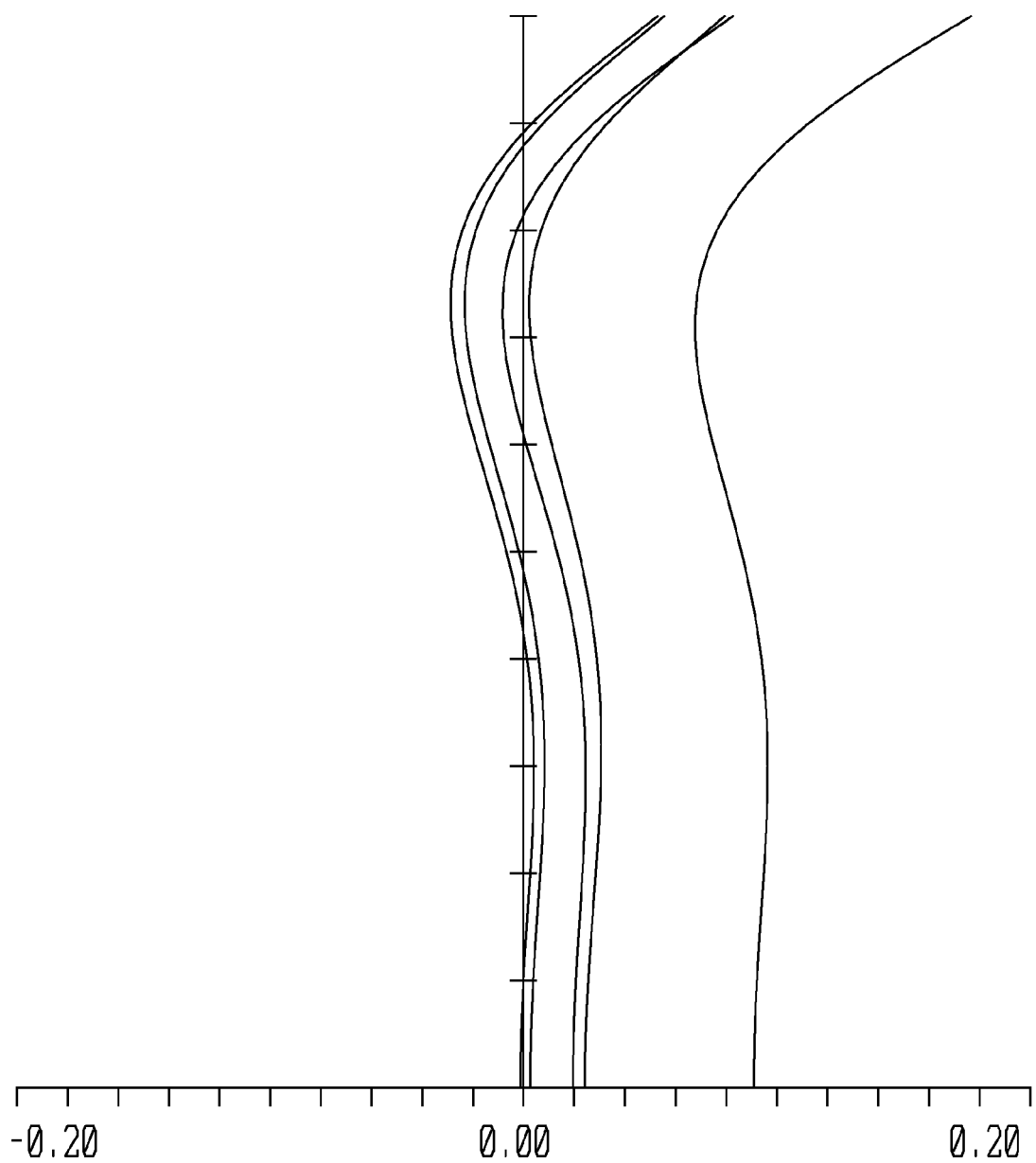
Figure 9D:
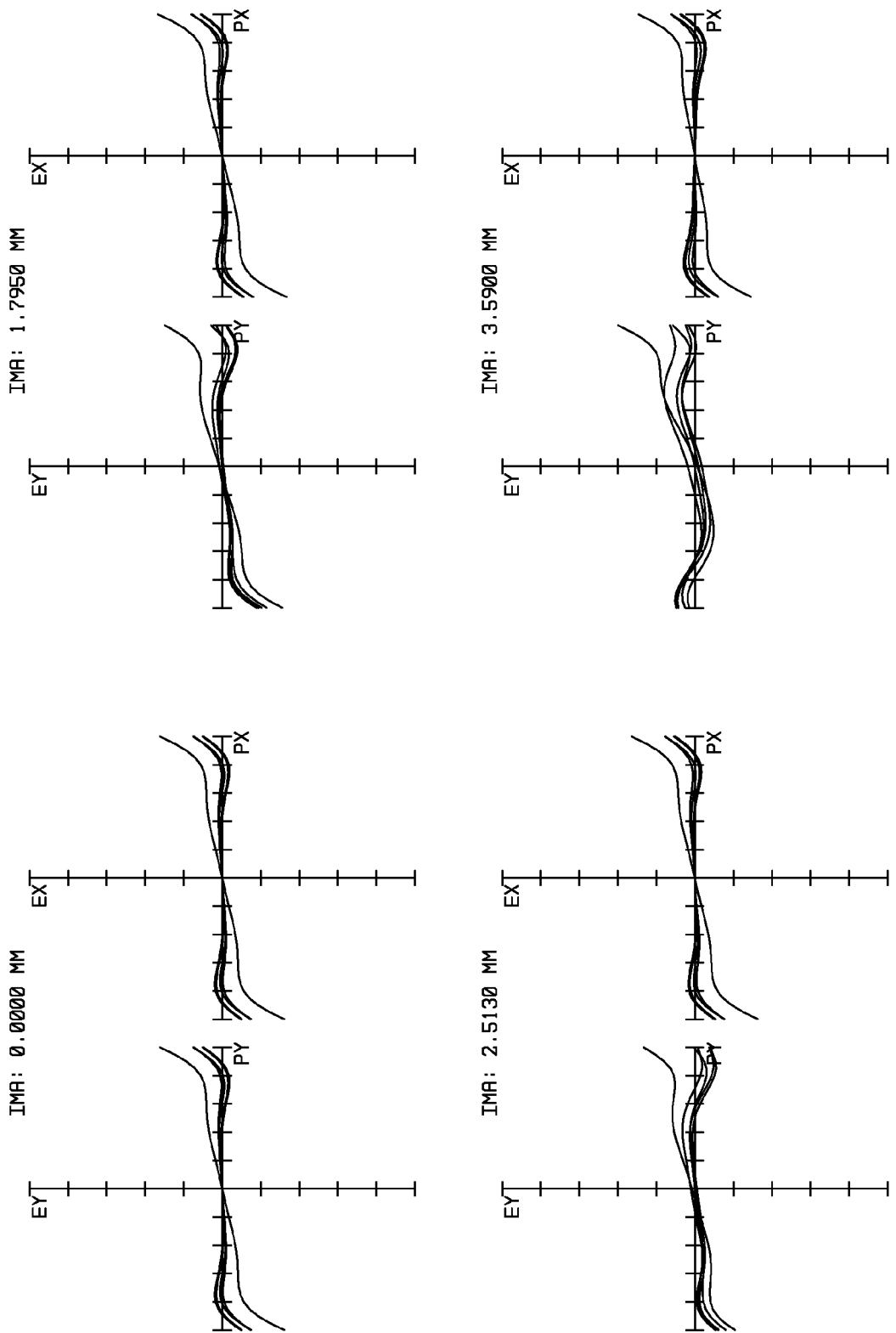

Designed according to the parameters listed in Data Tables 1 to 3, as shown in FIGS. 7A-7D (graphic representations of various aberrations at the wide-angle end), FIGS. 8A-8D (graphic representations of various aberrations at the medium-angle end) and FIGS. 9A-9D (graphic representations of various aberrations at the telephoto end), the present compact zoom lens system provides excellent correction of various aberrations and thus a high level of optical performance. In these graphs, FIGS. 7A, 8A and 9A are respective graphic representations of field curvature at the wide-angle end, the medium-angle end and the telephoto end, FIGS. 7B, 8B and 9B are respective graphic representations of distortion aberration at the wide-angle end, the medium-angle end and the telephoto end, FIGS. 7C, 8C and 9C are respective graphic representations of longitudinal spherical aberration at the wide-angle end, the medium-angle end and the telephoto end, and FIGS. 7D, 8D and 9D are respective graphic representations of coma aberration at the wide-angle end, the medium-angle end and the telephoto end.

As discussed above, in comparison with the prior art, the compact zoom lens system constructed according to the present invention only consists of three lens groups G1, G2 and G3 all having positive refractive power. Preferably, the present compact zoom lens system is only comprised of six lenses L1-L6 and one reflecting element P. The first lens group G1 is stationary to allow for a fixed overall length and better reliability of the present zoom lens system. The second and third lens groups G2 and G3 are both movable along the optical axis to effect zooming and focusing. The first lens group G1 has a reflecting element P for bending the incident light path from the object to be photographed, thereby shortening the total length of the optical system. In addition, each of the first, second and third lens groups G1, G2 and G3 has at least one aspheric lens surface, whereby various aberrations can be effectively corrected to obtain optimal image quality. By this specific optical configuration, the compact zoom lens system of the present invention has the advantages of small size, simple structure, low cost, good reliability and better image quality. Further, the present compact zoom lens system satisfies the following condition:

$$0.505 < EFL/fG2 < 1.285$$

where fG2 represents the effective focal length of the second lens group G2 and EFL represents the effective focal length of the present compact zoom lens system.

It is understood that the present compact zoom lens system is not only applicable to small-sized image pickup devices such as digital still cameras and digital video cameras, but also is suitable to serve as an image forming part in mobile phones, personal computers, personal digital assistances etc.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A compact zoom lens system, in order from an object side to an image side along an optical axis thereof, comprising:
   a first lens group having positive refractive power;
   a second lens group having positive refractive power; and
   a third lens group having positive refractive power;
      wherein, the first lens group is stationary and includes a reflecting element for bending the light path, both the second and third lens groups are movable along the optical axis, each of the first, second and third lens groups has at least one aspheric lens surface, and when zooming from a wide-angle end to a telephoto end, the second lens group moves toward the object side and the third lens group moves toward the image side.

2. The compact zoom lens system as claimed in claim 1, wherein the reflecting element is in the form of a prism.

3. The compact zoom lens system as claimed in claim 1, wherein the third lens group serves as a compensating lens group to move together with the second lens group during zooming, and then moves independently for focusing.

4. The compact zoom lens system as claimed in claim 1, wherein the first lens group includes, in order from the object side to the image side along the optical axis, a first lens having negative refractive power, the reflecting element and a second lens having positive refractive power.

5. The compact zoom lens system as claimed in claim 4, wherein the second lens of the first lens group is an aspheric lens.

6. The compact zoom lens system as claimed in claim 5, wherein both the object-side surface and the image-side surface of the second lens of the first lens group are aspheric surfaces.

7. The compact zoom lens system as claimed in claim 4, wherein the first lens of the first lens group is a meniscus concave lens and the second lens of the first lens group is a meniscus convex lens.

8. The compact zoom lens system as claimed in claim 7 wherein the meniscus concave lens is convex toward the object side and the meniscus convex lens is convex toward the image side.

9. The compact zoom lens system as claimed in claim 1, wherein the second lens group includes, in order from the object side to the image side along the optical axis, a first lens having positive refractive power, a second lens having positive refractive power and a third lens having negative refractive power.

10. The compact zoom lens system as claimed in claim 9, wherein the first lens of the second lens group is an aspheric lens.

11. The compact zoom lens system as claimed in claim 10, wherein both the object-side surface and the image-side surface of the first lens of the second lens group are aspheric surfaces.

12. The compact zoom lens system as claimed in claim 10, wherein the first, second and third lenses of the second lens group are respectively in the form of a biconvex lens, a biconvex lens and a biconcave lens.

13. The compact zoom lens system as claimed in claim 12, wherein the second and third lenses of the second lens group are cemented with each other to constitute a cemented lens having negative refractive power.

14. The compact zoom lens system as claimed in claim 10, wherein the second lens group further includes an aperture stop disposed on the object side of the first lens of the second lens group and movable with the second lens group during zooming.

15. The compact zoom lens system as claimed in claim 1, wherein the third lens group consists of a biconvex lens.

16. The compact zoom lens system as claimed in claim 15, wherein the biconvex lens of the third lens group has an aspheric surface.

17. The compact zoom lens system as claimed in claim 16, wherein the biconvex lens of the third lens group is made of plastic.

18. The compact zoom lens system as claimed in claim 1, satisfying the following condition:

$$0.505 < EFL/fG2 < 1.285$$

where fG2 represents the effective focal length of the second lens group and EFL represents the effective focal length of the compact zoom lens system.

* * * * *